(12) United States Patent
Carstensen

(10) Patent No.: US 7,108,063 B2
(45) Date of Patent: *Sep. 19, 2006

(54) CONNECTABLE ROD SYSTEM FOR DRIVING DOWNHOLE PUMPS FOR OIL FIELD INSTALLATIONS

(76) Inventor: Kenneth J. Carstensen, 1860 Whiteoak Dr., Apt. 211, Houston, TX (US) 77000-7555

( * ) Notice: Subject to any disclaimer, the term of this patent is extended or adjusted under 35 U.S.C. 154(b) by 0 days.

This patent is subject to a terminal disclaimer.

(21) Appl. No.: 09/961,391

(22) Filed: Sep. 25, 2001

(65) Prior Publication Data

US 2002/0076273 A1    Jun. 20, 2002

Related U.S. Application Data

(60) Provisional application No. 60/235,186, filed on Sep. 25, 2000.

(51) Int. Cl.
*E21B 17/10* (2006.01)

(52) U.S. Cl. ............... 166/241.2; 166/241.4; 166/242.6; 285/333; 403/342; 403/343

(58) Field of Classification Search ............. 403/258, 403/263, 296, 301, 300, 306, 307, 343, 305, 403/293, 294, 342; 285/333; 166/242.6, 166/241.2, 241.4
See application file for complete search history.

(56) References Cited

U.S. PATENT DOCUMENTS

| | | | | |
|---|---|---|---|---|
| 595,437 | A | * | 12/1897 | Greenfield ............... 285/53 |
| 1,851,714 | A | * | 3/1932 | McCullough ........... 403/296 |
| 2,853,328 | A | * | 9/1958 | Halgren ............. 403/343 X |
| 3,476,409 | A | * | 11/1969 | Benteler ............. 285/148.19 |
| 3,572,777 | A | * | 3/1971 | Blose et al. ............ 285/334 |
| 3,645,570 | A | * | 2/1972 | Johansson et al. ......... 403/307 |
| 3,729,219 | A | * | 4/1973 | Crane .............. 403/296 X |
| 3,822,952 | A | * | 7/1974 | Johansson et al. ......... 403/343 |

(Continued)

OTHER PUBLICATIONS

G. Takacs, Modern Sucker-Rod Pumping, 1993, p. 52-77; Penn Well Books.

(Continued)

*Primary Examiner*—Daniel P. Stodola
*Assistant Examiner*—Michael P. Ferguson
(74) *Attorney, Agent, or Firm*—Jones, Tullar & Cooper, P.C.; Raymond A. Bogucki

(57) ABSTRACT

Improved sucker rod joints for down hole petroleum pumping applications are provided within the form factor of standard API sucker rods, such that existing inventory in suitable condition is fully usable in more demanding applications. The pin ends are selected or processed such as to provide preselected axial distance between a flat pin end and at least one reference surface, such as a threaded region or reference shoulder or both. The coupler is dimensioned such that the pin ends are in abutment either with each other or with opposite sides of an intervening torque washer in the central region, when the connection is made to a selected level of thread engagement. Furthermore, the engagement is such as to put the pin ends in compression and the coextensive length of coupler in tension. This increases frictional restraints and locks the elements together to resist fatigue failure upon cycling and to insure together with an anaerobic adhesive sealant, against back threading. This arrangement enables standard quality sucker rods to be employed in a configuration which is mechanically secure and highly resistant to tensile, bending and torsional forces, thus assuring a greater strength at the joint than in the rod itself, and resisting the effects of material fatigue arising from long term and stressful cycling operations.

25 Claims, 11 Drawing Sheets

U.S. PATENT DOCUMENTS

| | | | |
|---|---|---|---|
| 3,859,503 A * | 1/1975 | Palone | 166/60 |
| 4,205,926 A * | 6/1980 | Carlson | 403/305 X |
| 4,332,502 A * | 6/1982 | Wormald et al. | 403/343 |
| 4,568,113 A * | 2/1986 | Axford et al. | 285/334 |
| 4,852,655 A * | 8/1989 | Guy | 166/380 |
| 4,875,710 A * | 10/1989 | Mercado | 285/355 |
| 4,968,068 A * | 11/1990 | Kenneth | 403/343 X |
| 5,129,689 A * | 7/1992 | Newski et al. | 285/333 |
| 5,320,388 A * | 6/1994 | Lacy et al. | 285/55 |
| 5,347,881 A * | 9/1994 | Watson et al. | 403/305 X |
| 5,794,985 A * | 8/1998 | Mallis | 285/330 |
| 5,967,691 A * | 10/1999 | Lancelot, III | 403/296 X |
| 6,212,763 B1 * | 4/2001 | Newman | 173/180 |
| 6,328,499 B1 * | 12/2001 | Reding et al. | 403/305 X |
| 6,942,254 B1 * | 9/2005 | Cartsensen | 285/333 |

OTHER PUBLICATIONS

Edward L Hoffman, "Finite Element Analysis of Sucker Rod Couplings With Guidelines for Improving Fatigue Life", Sandia National Laboratories, 1997.

API Specification For Sucker Rods, p. 7.

API Recommended Practice, 11B.

* cited by examiner

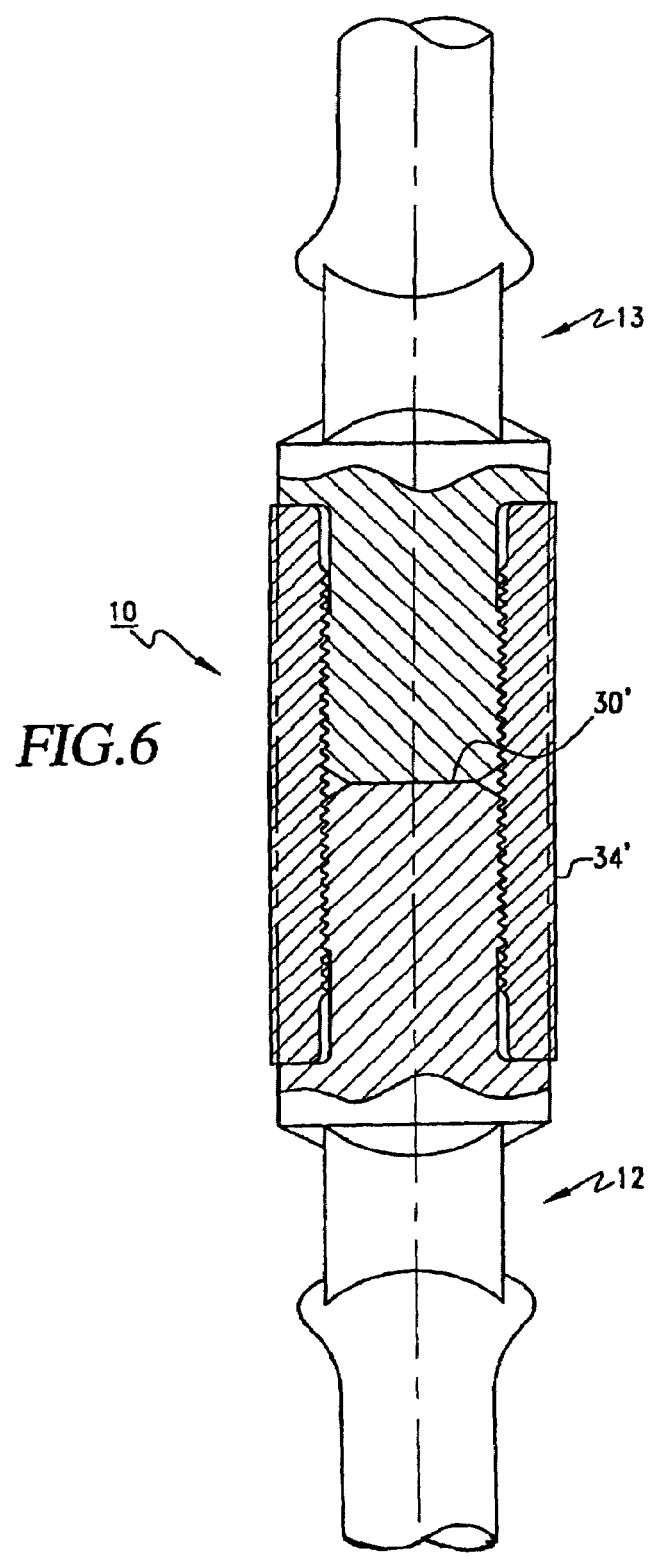

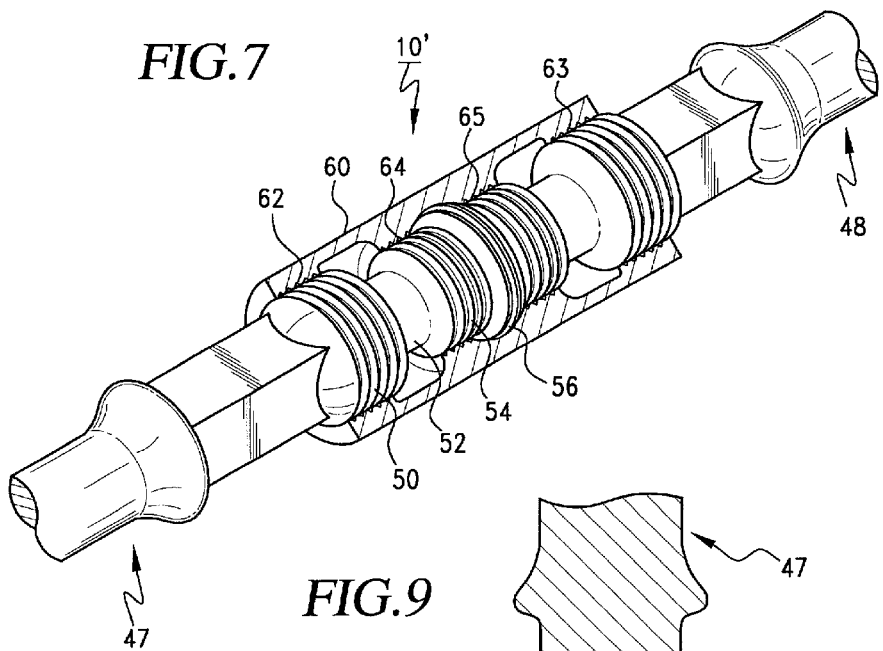
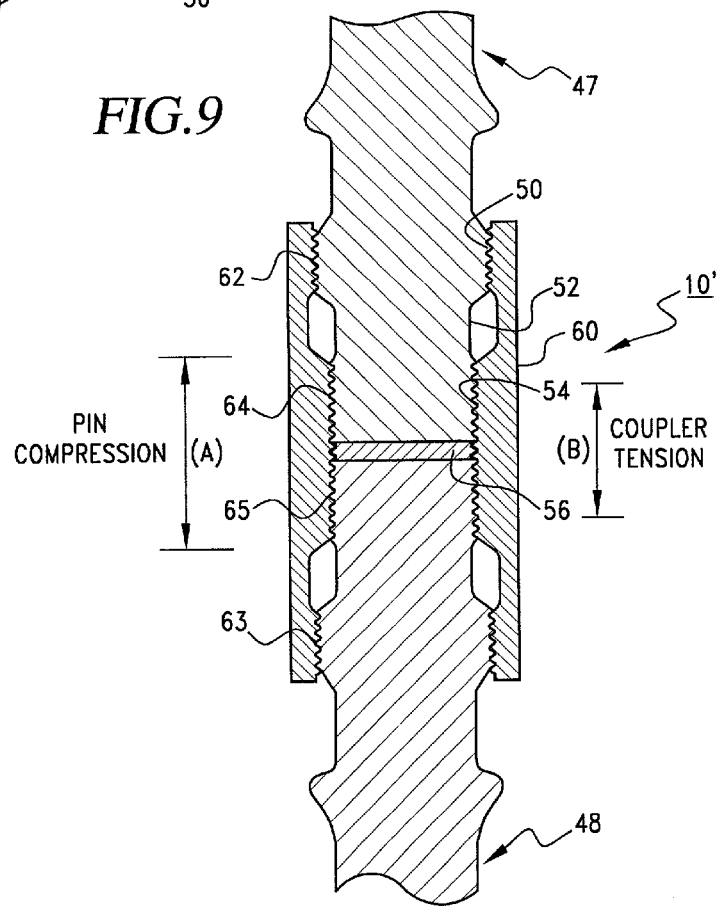

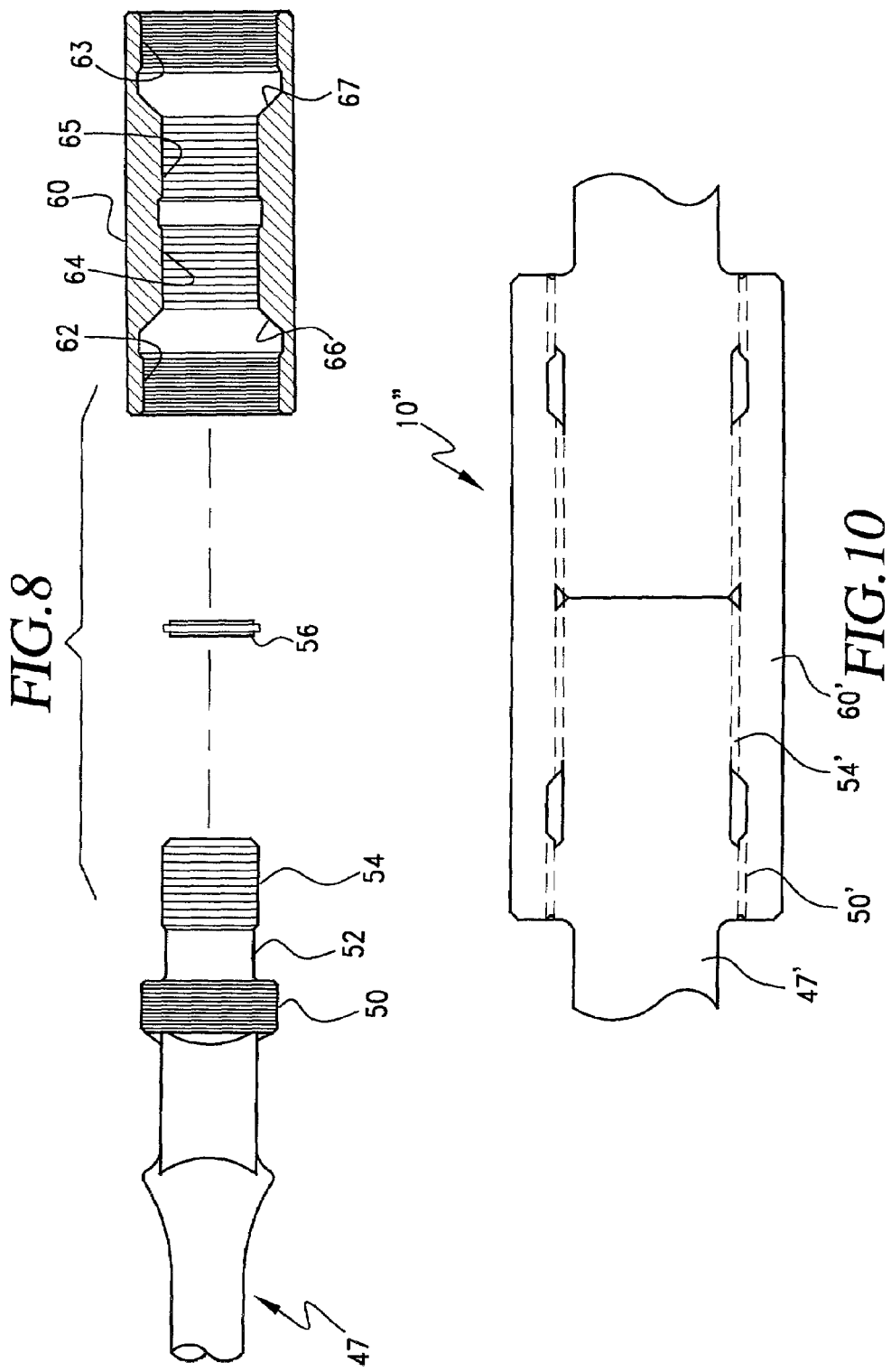

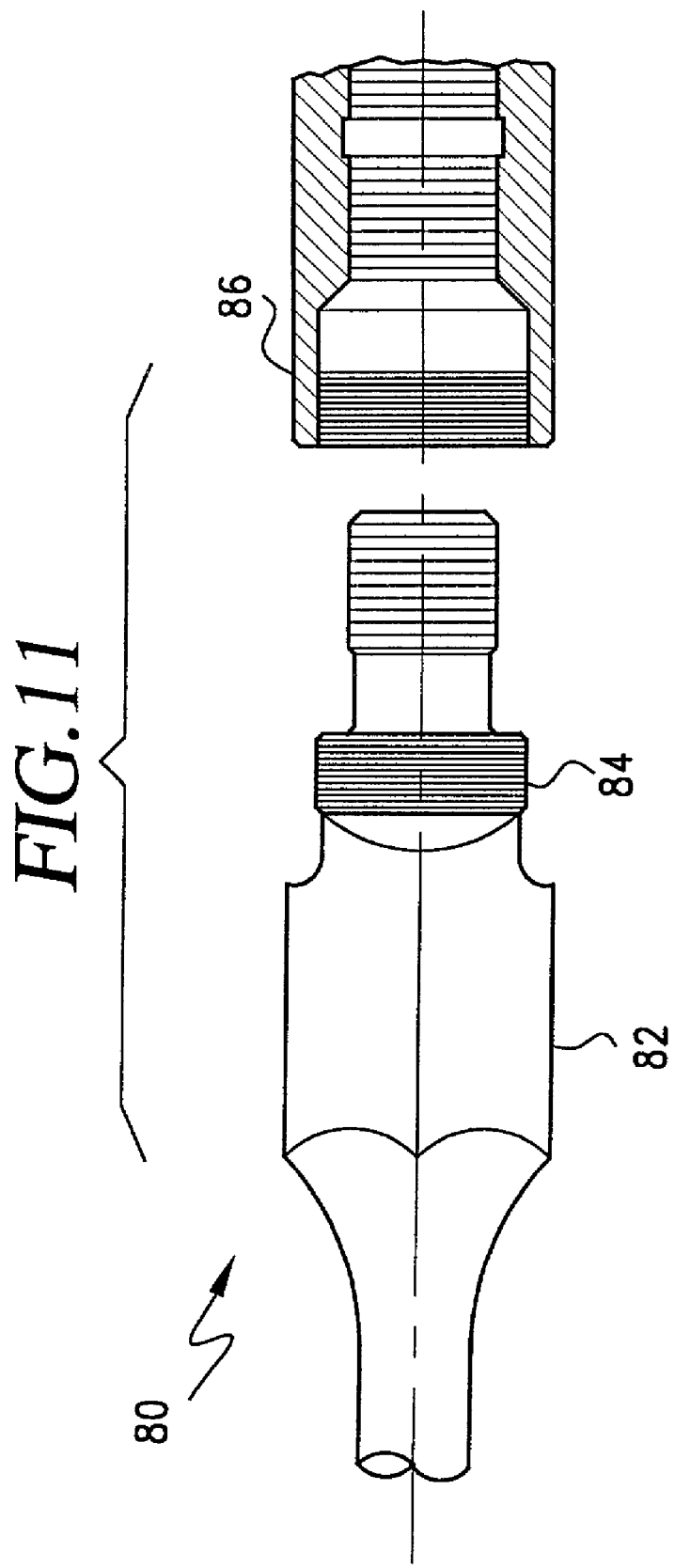

IMPROVED JOINT

CONNECTABLE ROD SYSTEM FOR DRIVING DOWNHOLE PUMPS FOR OIL FIELD INSTALLATIONS

REFERENCE TO PRIOR APPLICATION

This application relies for priority on a U.S. provisional application by Kenneth J. Carstensen filed Sep. 25, 2000, Ser. No. 60/235,186 and entitled "Connectable Rod System for Driving Downhole Pumps for Oil Field Installations".

FIELD OF THE INVENTION

This invention relates to sucker rod systems for use within oil field tubing to drive downhole pumps in reciprocating or rotary motions.

BACKGROUND OF THE INVENTION

Artificial lift systems for oil wells have predominantly used connectable rod systems extending from walking beam drives through the tubing in the well bore to a reciprocating pump of the type which, in each cycle, raises a volume of fluid upward along the tubing string. Valves in the pump allow ingress of the oil at the lowermost part of the cycle, and lift the oil flow upwardly into the tubing system at the uppermost part of the cycle. Because the pump must work against the weight of the rod string and the hydraulic head of the fluid in the production tubing string, which head pressures can be extremely high dependent upon the depth of the well, high loads and forces in tension are present during the upstroke part of the cycle, resulting in very high stresses. In contrast, during the down stroke the loads and forces fall off greatly, often to near zero and not uncommonly to a negative load, i.e. into the compressive stress range. The rod system itself, termed a sucker rod string, has also been used more recently for driving other mechanisms such as bottom hole rotary pumps, where the sucker rod string is used as a very long drive axle. This system employs a small rotary drive unit mounted directly on the well head, which saves the costs of placement and building a level concrete pad for the pump to operate on. The rotary pump (progressive cavity pump), when appropriately used, has advantages in moving larger fluid volumes than reciprocating pumps and the more massive surface equipment that is used with them.

The American Petroleum Institute (API) has long since established standards for sucker rod systems including the parameters required for the rod strings used under different conditions, and for the designs of the rod threaded pin ends and the couplings used to join one sucker rod to another. In consequence of these standards, which include variants as to size and materials, the design that is primarily in use has remained virtually unchanged for many decades. The API sucker rod has an elongated round solid body. The rod itself is provided at each end with an enlarged rounded knuckle to accommodate the rig lifting equipment, an adjacent wrench flat for turning, and an externally threaded length for connection to internally threaded collars or couplings. Specific rods are of material and diameter chosen to be suitable for withstanding stresses anticipated for a specific load problem, and the sequence of rods in a string is designed with graduated characteristics that meet the changing loads as the string length increases. The threaded length at each end of a rod is provided by machining or by rolling (for superior properties) and this threaded section is separated from the shoulder by a slightly undercut length commonly referred to as the pin neck. The shoulder is used as a physical reference for one end of a coupler in the form of a hollow sleeve having internal thread sections which matingly engage each of two oppositely inserted threaded pin ends to interconnect two sucker rods. The dimensions are selected such that, with proper thread engagement, the shoulders on the two pin ends abut the opposite ends of the coupler and place the two ends of the coupler under compression. This provides a joint that is more rigid than the principal length of the rod, and has sufficiently firm engagement to establish a seal in order that well fluids can be kept out of the thread areas and oppose but not necessarily prevent unthreading of the connection under operating conditions. Apart from load bearing capacity, the primary operating requisite is the capability for long term reliability under continuous cycle loads. The API design is also used in sucker rods which have performance specifications higher than the several types (e.g. C. D. and K) within the API tables. Where higher strengths are desired, manufacturers use the API configuration in general but set out their own specifications.

As pointed out in the book "Modern Sucker-Rod Pumping" by Gabor Takacs (Penwell Books, Tulsa, Okla., 1993), at pages 52–58, conflicting demands are made on the elements of a sucker rod joint, and these are accentuated by the operative demands placed upon the sucker rod system. The "make up" must be with substantially greater torque than a hand-tight connection, to prevent unthreading. When properly made up, the pin necks are in tension and the coextensive lengths of the coupler are in compression, while between the two threaded pin ends, the coupler is under zero pre-stress. With this design condition, however, the desired fixed engagement between the coupler end and the pin shoulder deteriorates with time, for a number of practical operative reasons. The primary cause is metal fatigue arising from the constant cycling of the string. Minor imperfections, whether introduced by nicks, scratches or corrosion, induce weaknesses which spread, during extended cycling, through the cross-sectional area of the pin or coupler. Metal fatigue deterioration is accentuated whenever static or cyclic forces introduce initially small gaps between the coupler end and the shoulder surface.

A more detailed consideration of these factors is set forth in a report entitled "Finite Element Analysis of Sucker Rod Couplings With Guidelines For Improving Fatigue Life" by Edward L. Hoffman, identified as Sandia report "Sand97-1652.USC122" captioned "For Unlimited Release" and printed in September 1997 by Sandia National Laboratories, Albuquerque, N. Mex. This report contains, at pages 63–65, recommendations for improving the characteristics of couplings under practical operating conditions. It is emphasized that the two primary objectives are locking the elements of the threaded connection together and improving the fatigue resistance. However, as pointed out by Takacs, the introduction of compression between the currently used elements tends to decrease the fatigue resistance, and thus is an inherent factor in limiting the expectable life with an API standard joint.

The emphasis on proper make up procedures is not, of course, misplaced, but it does not confront the practical problems that exist on the pulling unit rig. An approximation of proper make up can be provided by threading first to a hand tight position, then putting visible markers on the pins and couplers to designate proper "circumferential displacement" in relation to indicia on an "API card" developed for that specific connection. Manufacturers provide their own displacement cards for use with their specialized high strength sucker rod products. For one side of the connection, tightening to align the markers is relatively simple if other conditions are ideal. When the opposite sucker rod is to be engaged, however, the process for assuring that both pin ends are properly circumferentially aligned relative to the coupler can be very time consuming. Since torque can be applied only to the wrench flats, turning one rod usually turns the coupler and affects the alignment of the other rod, requiring a sequence of adjustments.

With time being of the essence at the pulling unit rig and weather and rig floor conditions seldom being ideal, crews often take short cuts when assembling sucker rod strings. The crew may ignore the indicia entirely, but the more common procedure is to make up two or three joints, observing the hydraulic wrench (power tong) pressure needed for proper alignment, and then make up the remainder of the joints using that power tong pressure setting so as to speed up string assembly. This approach ignores the tolerance variations in the elements as to thread and body geometry that affect the make up conditions at successive joints along the string, and the consequent inconsistencies significantly increase the danger of fatigue failure. It should be noted also that the analysis in the Sandia report uses a sucker-rod pin model of a solid bar, not the short length shoulders which actually exist, so that the contact forces and shoulder stresses are substantially higher than they would be in the actual case for given make up.

Under static conditions, the principal length of a sucker rod, for example a ⅞th inch rod, yields at a given pull load (e.g., 88,000 lbs on the average) while failure in the joint itself is at a higher level (e.g., 118,000 lbs average) However, since the rod body is a long smooth form and the end areas and the connections are a multitude of machined-in cross-section changes and stress risers, fatigue failures occur primarily in the joints, either in the coupler or pin ends, and this is confirmed by fatigue life tests under both field and laboratory conditions. Moreover, modern drilling installations employ horizontal directional drilling techniques and the flexure of elements at regions of curvature greatly increases bending stresses, cyclic wear and metal fatigue. As a result, when failure occurs it is often at the root of threads on the pin end of the connection, less often from thread shear on a pin end or coupler. Furthermore, failures have been found to be in the range of 90% in the connection and 10% in the rod body. Any sucker rod failure requires difficult and expensive retrieval and reentry procedures to be instituted and introduces expensive operating delays, costs of repairs, and loss of production.

Because the standards (virtually worldwide) for drilling and production equipment in the petroleum industry are those established by the API, and the specifications for high strength products from manufacturers are consistent with the API standards vast quantities of sucker rods are in inventory throughout the world. Any new configuration that would obsolete this inventory, no matter how technically promising, would not be economically feasible except for very limited situations. Not only should the sucker rod inventory remain usable, but ancillary factors, such as the standards set for string design and applied down hole use, should not be made obsolete. Also, the vast after market industry of maintenance, such as cleaning, inspection and reclassification so that sucker rods pulled from wells may be put back into service, would vanish. It is therefore highly desirable to provide a sucker rod connection system which is compatible in form and function with existing API sucker rod design and engineering, but at the same time provides high tensile strength, much higher torque capabilities, and superior resistance to fatigue failure.

SUMMARY OF THE INVENTION

Systems and devices in accordance with the invention employ a modified API sucker rod end area configuration, in a combination which unifies the pin ends with the coupler so as to yield higher torque capabilities and be resistant to the causes of fatigue failures, while also establishing unique and useful tension and compression pre-stress relationships and enabling a simplified and assured make up sequence.

Rod connections in accordance with the invention employ controlled force engagement between the end faces of opposing pins so as to compressively pre-stress the threaded pin ends, and also restrain the pin end beyond the pin neck and substantially tension the coextensive lengths of the coupler mid-section. By controlled axial and azimuthal restraints at opposite limits of the pin ends the male and female thread surfaces are locked together, inhibiting the minute physical displacements, even down to the microstructure level in the parts making up the unified combination, which eventually lead to larger gaps and movements, and ultimately fatigue failure. The pin end faces have opposing flat surfaces in areal compressive contact either with interposed torque washers, or each other, materially enhancing the restraints against both axial skewing and azimuthal shifting and doubling the material area in frictional contact that resists back-out. Assembly of the threaded members is aided by use of an anaerobic adhesive compound that thereafter resists back-out and provides an effective seal as well.

By close control and some prescreening, or by precise machine finishing of certain surfaces on the pin and coupler, the advantages of this new approach are maximized in terms of both the mechanical connection and ease and precision of assembly at the work-over rig. An existing sucker rod inventory can still be employed in utilizing the new approach. Once prepared, threaded engagement of the pin end into a coupler to a given dimension beyond hand tight engagement positions the pin end face at a chosen depth in the coupling. The length tolerances used are closely specified, so that when both pins are set in place and tightened, the pre-stress tension and compression levels are assured. Thus the connection can be first half assembled at a base site with one pin end properly engaged, and a crew at the rig site can quickly and reliably complete the connection with the second pin end merely by controlled circumferential displacement past the hand tight plane.

In a preferred version, the shoulder on a pin engages the coupler end, and the shoulder face is at a precise distance from the pin end face. Upon full makeup, both coupler ends and pin ends, made up against a center torque button, are under the desired compression. Sucker rods in the preexisting API manufacturer's inventory are thus useful to achieve fatigue failure performance which is at least several times better than API standard and related sucker rod. Although tensile load failure increases range only 2% to 5% higher, major gains from this approach are evidenced by tests for fatigue failure under cyclic operation that show an improvement in the range of 600% gain over the API design. By using augmented pre-stresses and contact areas in different ways, the new connection also offers distinct improvements when to failure tested under tension plus torsion loads, showing an average gain in the range of 250% over the API design, for example.

This axial pre-stressing in compression of the pin ends against themselves or the torque buttons also reduces the tendency of the API thread design itself to be a fatigue failure accelerator because bending moments during the make up process are introduced when a high helix angle and thread flank angle are combined along with differences in pin thread height and coupling thread height. Such factors also contribute radial loads that can degrade performance. The face-to-face contact between opposed thread surfaces adds frictional resistance against thread working as well as backout. Devices in accordance with the present invention, when made up to the proper circumferential displacement, provide a connection in which all three members are pre-stressed beyond expected operating load conditions, but well within the material ratings and accepted material safety factors. Furthermore, the connection system is rigid, stable and self-supporting throughout its three mating parts.

The compressive contact between pin ends is enhanced by finishing the pin ends, not only as to axial spacing from the shoulder, but also to provide circumferential chamfers and to assure smooth flatness of the end faces. The use of a central torque washer of different material than the pin ends is advantageous because it reduces the likelihood of galling on repeated makes and breaks of connections. The torque washer also can be selected to have a particular compensating axial dimension if desirable. When each pin end face engages an opposed face of an interposed torque washer, the washer serves as a pre-stress developer and a physical reference for connection makeup as well. Direct pin-to-pin nose contact can also be used, although the similar metals may tend to gall on repeated make and break operations.

Also in accordance with the invention, in a different configuration the pin end of a sucker rod not only includes the API-type thread length and the adjacent undercut pin neck region, but also incorporates a threaded surface of larger diameter formed within and in place of the circumference of the API shoulder. The pin ends again are finished flat to form compressive end faces, but the coupler is a sleeve having two pairs of internally threaded regions, one of smaller and one of larger inner diameter, each spaced on opposite sides of the center region, and dimensioned to receive both threaded regions of each pin end. Tighter tolerances, one-half or less, than those acceptable under API standards provide assurance that thread size and pitch variation will not affect desired thread bearing engagement. Compressive pre-stress on the pin ends and proper tension pre-stress in the coupler center are again established by engaging the pin faces against each other or against an intervening torque washer. The spaced apart threaded regions have more balanced loading if the outer threaded regions are about 70% in length relative to the inner sections but of a larger diameter. Although there is no axial engagement of the coupler ends against pin shoulders, the central pre-stressing and increased, distributed, thread lengths provide other benefits. For example, the added securement of the pin end on the opposite side of the pin neck from the pin end face that is provided by the larger diameter threaded region helps to assure opposition to the harmful effects of bending.

With this arrangement, the pin ends act against each other, and final make up assures that both are adequately locked against backout, usually aided by application of an anaerobic adhesive as a lubricant. The added thread lengths have substantially greater bearing surface area than the terminal thread lengths, so that the joint not only resists tensile forces but also lateral or bending forces. For example, when a $7/8^{th}$ inch sucker rod connection is tested to destruction under a pull load, failure does not take place until a load of 175,000 pounds is reached. The failure then is at the coupler center, not at the pin ends or in the threads and at much higher load values than the 118,000 pound load usually observed with rod body failure.

This alternative approach tested 70% stronger in tension than API in the connection area but with relatively lesser improvements in load and unload cycle life. It is of particular advantage when used in dead pull jobs, such as fishing and jarring.

Sucker rods in accordance with the invention also have like advantages as to life and ease of operative use when used in rotary pump systems, where the cyclic operation is different but the stresses and fatigue factors are nevertheless significant.

BRIEF DESCRIPTION OF THE DRAWINGS

A better understanding of the invention may be had by reference to the following description, taken in conjunction with the accompanying drawings, in which:

FIG. 6 is a side sectional view of an alternative arrangement of the connection of FIGS. 1, 3 and 4 in which no torque washer is used;

FIG. 7 is a perspective view, partially broken away, of a different sucker rod joint in accordance with the invention utilizing an internal torque washer between abutting pin end faces;

FIG. 8 is an exploded view of elements of the arrangement of FIG. 9 showing further details thereof;

FIG. 9 is a side sectional view of the arrangement of FIGS. 7 and 8, generally indicating also the stresses and thread relationships therein;

FIG. 10 is a side view, partly in section, of a pin end and coupler for a sucker rod connection of the alternative configuration, as used for extra heavy duty applications;

FIG. 11 is a side sectional view of a "slim-line" or "slim-hole" connection of the alternative configuration;

DETAILED DESCRIPTION OF THE INVENTION

The drive connection or linkage between production equipment at the surface of an artificial lift installation and the pump at the downhole oil or gas bearing zone comprises a sucker rod string formed of a series of rods of a given length (typically between 25–30 feet long and in a selected size from ½" to 1 and ⅛" in diameter). The sucker rod string is within the interior of the production tubing via which oil is lifted to the surface, and the elements of the string must withstand the static and cyclic stresses encountered, the inevitable frictional forces and the cumulative effects of long term cycling. When modem directional drilling techniques are used to form curved well bores, such stresses and forces increase considerably over a purely vertical installation, for both reciprocating and rotary pumps.

A sucker rod coupling system in accordance with the invention is usable with different downhole pumps, but the principal example is of a conventional reciprocating pump.

Figure 2:
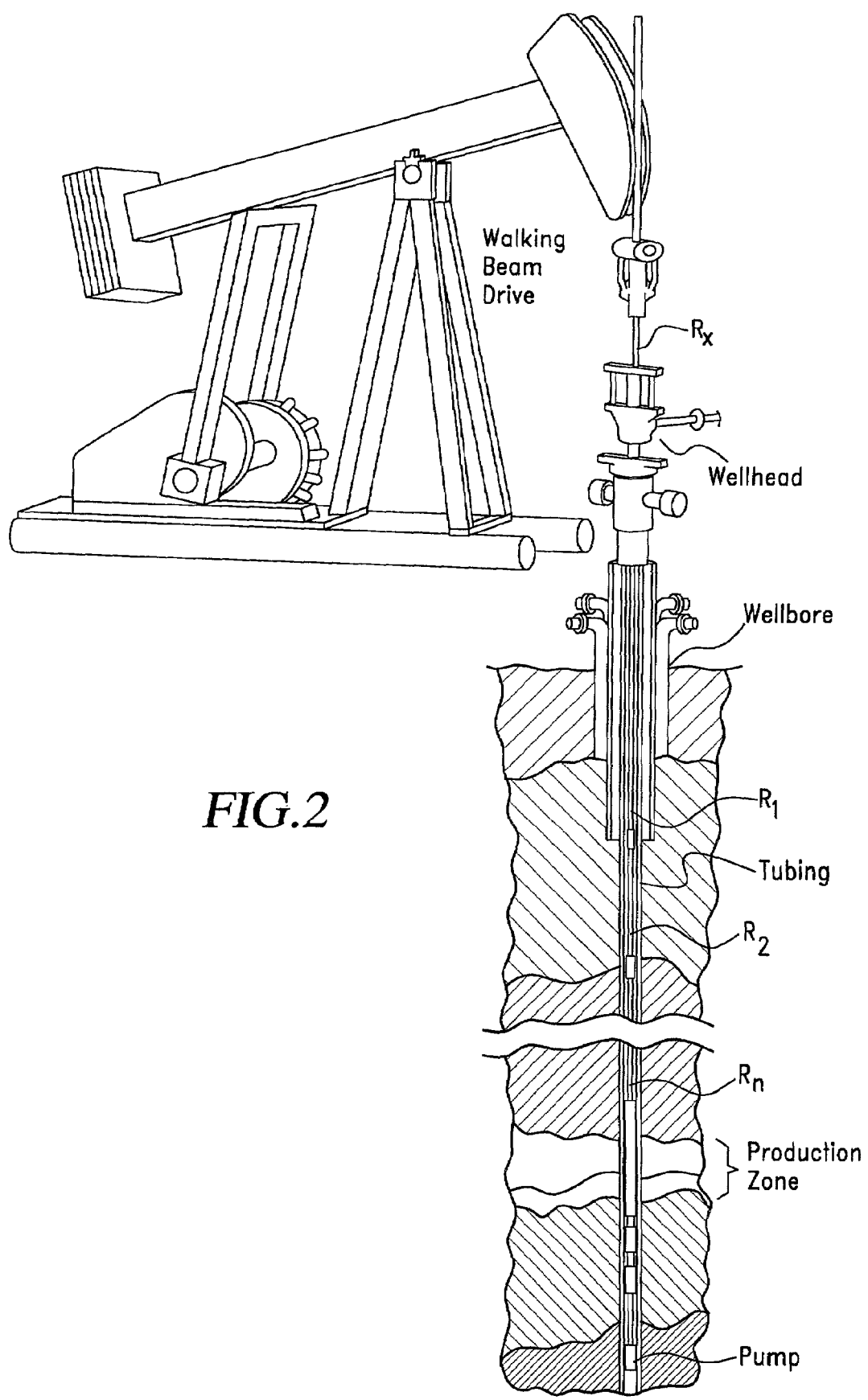
FIG. 2 is a simplified view of a sucker rod string installation depicting sucker rod being added to a string at the rig at a well head using a horse head drive system.

As seen in FIG. 2, a typical horse head or walking beam drive A at a wellhead B is mounted above a wellbore C including internal production tubing D extending down to a production zone E. The well bore C and tubing D may be substantially linear or curved into an angled or horizontal path in order to reach the production zone E, where a pump F is reciprocated to force petroleum products upwardly within the tubing D from the production zone E. Since FIG. 2 is merely a general and simplified schematic, guides, packers, and other feature employed in production have not been included. The elements $R_1$, $R_2$, $R_3$ ... $R_n$ of a sucker rod string are serially connected along the length of the well bore to the pump F. New elements, $R_x$, are added at the well head B using a fixed derrick system to effect successive end-to-end engagement of mating male and female threads. Upon completing the string, the drive A is coupled to the uppermost rod and pumping then is initiated and continues with minimal interruption until the production rate no longer justifies. The numerous failure points along the sucker rod string represent a substantial potential for failure and system downtime.

Figure 1:
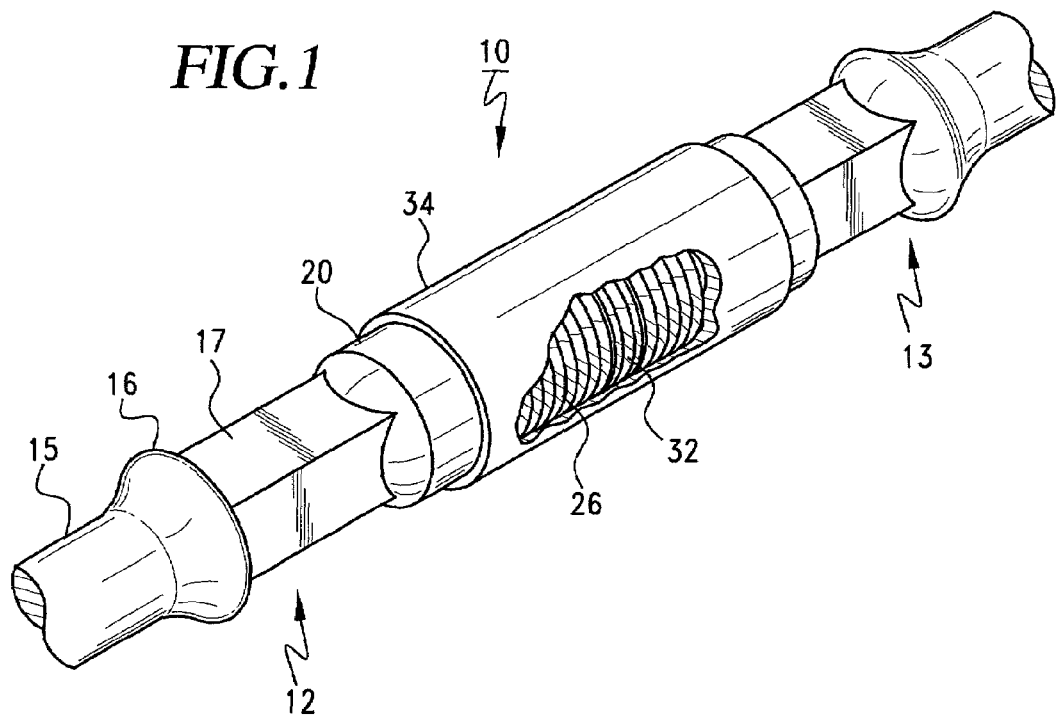
FIG. 1 is a perspective view, partially broken away, of a sucker rod connection using pin ends, a torque washer, and a coupler in accordance with the invention.
Figure 3:
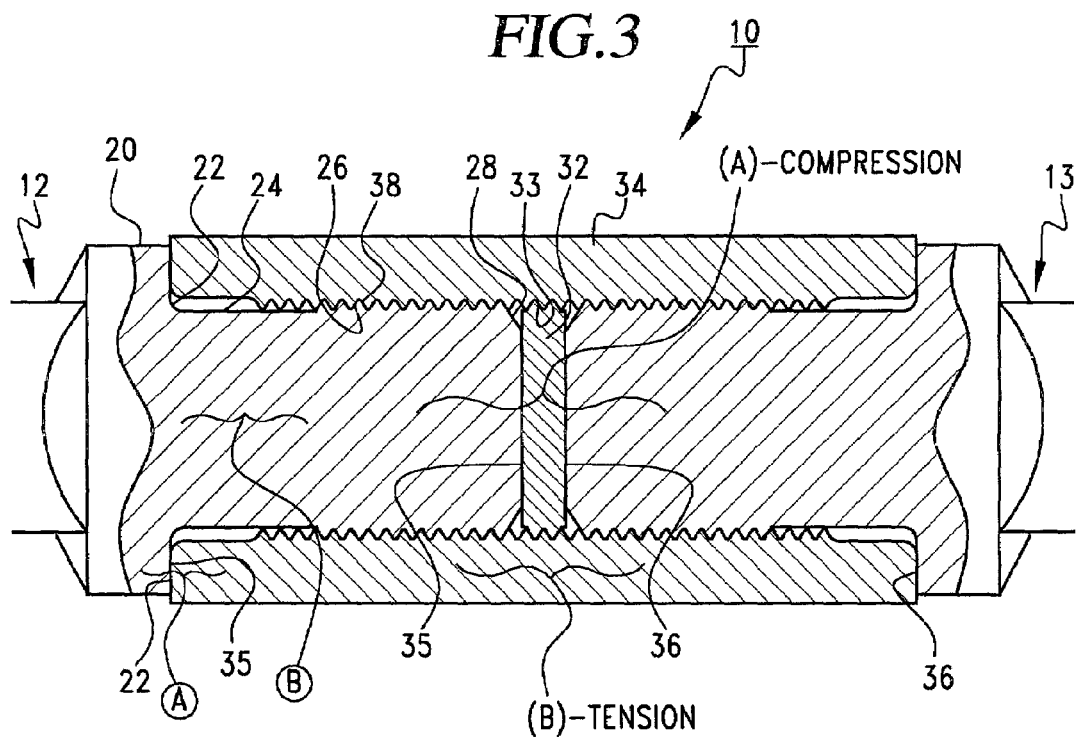
FIG. 3 is a side sectional view of the sucker rod connection of FIG. 1.
Figure 4:
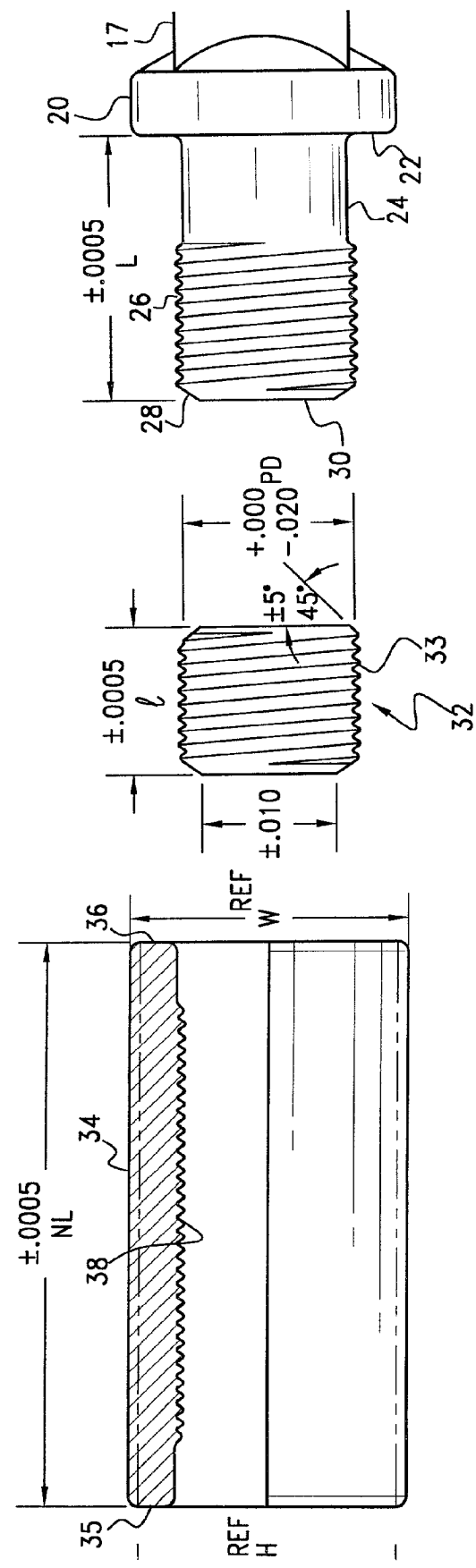
FIG. 4 is an exploded view of one pin end, the torque washer, and a coupler as in FIG. 1 showing further details thereof and dimensional references for Tables employed herein.

Referring now to FIGS. 1, 3 and 4, each connection or joint 10 intercouples first and second sucker rods 12, 13 whose oppositely directed ends are joined together during makeup as the sucker rod string is progressively assembled. Under the API convention, the sucker rods are each of a chosen steel or alloy material and approximately 25' long. API specifications for different applications cover the most encountered situations, but where higher strengths are needed, manufacturers use the API form but define their own specifications. API rods typically range from ⅝" to 1⅛", whereas manufacturers may supply rods up to 1½". The example here is principally of ⅞th$^{th}$ inch diameter sucker rod, which is an intermediate size. Because the sucker rods are essentially uniform, only the pin end portion of the first rod 12 is numbered and described in detail, it being understood that the complementary second rod 13 would be identical, but be in a mirror image relationship when installed. From the principal, substantially uniform diameter, length of the body 15 of the first rod 12 (in the direction toward the free end as shown in FIGS. 1, 3, and 4) the rod is enlarged, as by an upset operation, to a bell shaped transition or knuckle 16 of larger outer diameter, which is at one terminus of the pin. The knuckle 16 is contiguous to a square cross-section wrench flat 17 used for torquing in make and break operations, and adjoining the API end shoulder 20 which has a radial bearing face 22. The bearing face 22 provides a first axial reference for the pin end 23 on the sucker rod 12. Adjacent the end shoulder 20, the pin end 23 includes an undercut length or pin neck 24 adjoining a length of male thread 26 meeting API spec as to thread diameter, shape and pitch. This length 26 terminates in a peripheral chamfer 28 at its free end and a transverse, flattened end face 30. By rolling the threads to shape, or by machining them, with shot peening if desired, the thread properties are enhanced.

The end face 30 has a precise axial spacing from the radial bearing face 22 on the shoulder 20, as described in more detail below. By finishing the end face 30 to a surface flatness such that it deviates less than about 0.0005" from the end face plane, the end face provides a frictional bearing surface that withstands substantial axial force. The end face 30 engages one face of a torque washer or button 32 having a like male thread 33 at its outer periphery. Both the pin end 23 of the sucker rod 12 and the torque washer 32 fit within a coupler or sleeve 34 which is of API design but has a more precise length terminating at end faces 35, 36. The tolerance observed, given the nominal API dimension 4.000" for most sizes) is ±0.0005". An API specified female thread 38 is machined into the inner diameter of the coupler 34.

The axial and diametral dimensions of the couplers, for different sizes of sucker rods, are set forth hereafter in Table A (dimensions in all tables being given in inches):

TABLE A

| | COUPLER | | |
|---|---|---|---|
| SIZE | COUPLER LENGTH NL | STANDARD OUTSIDE DIAMETER W | SLIM HOLE OUTSIDE DIAMETER WSH |
| ⅝ | 4.000 | 1.500 | 1.250 |
| ¾ | 4.000 | 1.625 | 1.500 |
| ⅞ | 4.000 | 1.813 | 1.625 |
| 1 | 4.000 | 2.188 | 2.000 |
| 1⅛ | 4.500 | 2.375 | N/A |

The "standard" API form factor is that shown in FIGS. 1, 3, and 4, while "slim hole" (also called "slim line") and heavy duty versions may alternatively be employed dependent on an operator's needs for a given situation. The present concepts are useful with all such designs.

With this coupler, the pin end length between the end face 30 and the radial bearing surface 22 on the shoulder 20 is as shown, for different sucker rod sizes, in Table B below:

TABLE B

| | PIN END |
|---|---|
| SIZE | PIN LENGTH L |
| ⅝ | 1.2100 |
| ¾ | 1.3970 |
| ⅞ | 1.5850 |
| 1 | 1.8350 |
| 1⅛ | 2.0850 |

The lengths NL and L are depicted graphically in the exploded view of FIG. 4, which also depicts various dimensions for the torque washer which are quantified in Table C below:

TABLE C

TORQUE WASHER

| SIZE | BUTTON LENGTH 1 | THREAD PITCH DIAMETER PD | CHAMFER START DIAMETER A |
|---|---|---|---|
| 5/8 | 1.5640 | .871 | .771 |
| 3/4 | 1.1900 | .996 | .896 |
| 7/8 | .8140 | 1.121 | 1.021 |
| 1 | .3140 | 1.308 | 1.208 |
| 1 1/8 | .3140 | 1.496 | 1.396 |

The torque washer 32 may have a thread pitch diameter that is slightly different than the thread pitch diameter on the pin end to enable the torque washer to be inserted manually but with some frictional engagement to prevent creep. The start diameters of the end chamfers are closely defined so that the end faces correspond in area to the pin ends and there is no peripheral overlap under high pressure engagement.

Figure 5:
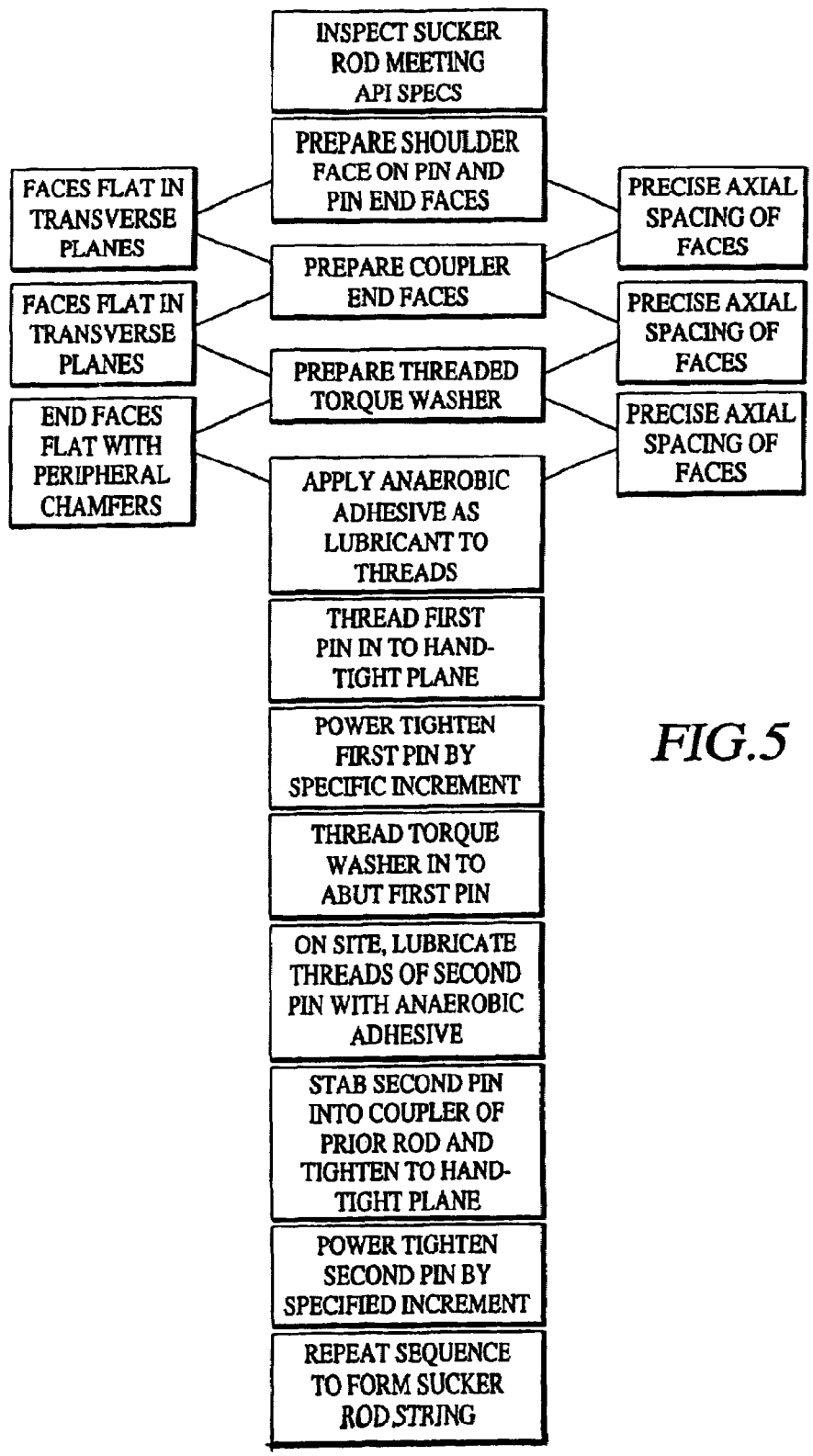
FIG. 5 is a block diagram of a sequence of steps for practicing sucker rod connection makeup in accordance with the invention.

These configurations predetermine not only axial positioning but also proper pre-stressing when pin ends are engaged to predetermined angles beyond the hand tight plane. The angles are those set by the applicable API (or manufacturers) card. This enables simplified and assured methods of assembling sucker rod strings with minimal down time. With reference to FIG. 5, the process begins with pre-screening and preparation of pins to assure they are within the stated dimensions and tolerances. The pin shoulder and pin end face must be at 90π relative to the longitudinal axis of the pin, and the same is true of the end surface of the coupler. This assures that contact pressures are uniform about the circumference. It also assures that there is no bending stress in the undercut length of the pin and minimal tendency to fail at the junction of thread and undercut. Note that, except for the torque washer, thread pitch diameter is not a factor, since the API threads are not tapered and mechanical securement is provided by axial engagement of thread faces, eliminating the damaging effects of helix and thread flank angle bending that derive from threads made according to the API standards. The thread surfaces are first lubricated with a compound, such as "SEALLUBE" which acts as an anaerobic adhesive after short term curing in place.

The desired engagement between a first pin end and the coupler after lubrication, can most conveniently be set at the sucker rod manufacturing plant or finishing shop. This is accomplished, with these criteria, simply by threading the first pin end in to the hand tight position, and then further turning through an angle determined by a card which specifies the API or manufacturer's recommendation.

This engagement compresses the coupler end face 35 against the pin end shoulder 20, pre-stressing the length of coupler and pin end between the shoulder bearing surface and the threaded region. The undercut length, or pin neck, 24 and most of the thread length 26 of the pin end 23 are under tension. However, the tension along the thread length 26 diminishes toward the pin free end, although even the side faces of the last pin threads are still axially engaged against the female threads to inhibit transverse and azimuthal shifting, even down to the microstructure level of the material used. In complementary fashion, the opposing length of coupler 34 is under compression, the level being substantially constant until close to the pin end 23. The makeup is to a pre-stress level which is 20–30% greater than the API displacement.

With the first pin 12 in the coupler 34, the torque washer 32 is threaded in from the opposite end of the coupler 34 until firmly engaged against the end face 30. The torque washer 32 can be dimensioned slightly larger in diameter to be frictionally restrained within the female threads 38, but only enough to allow manual turning, as by a rubber-faced tool, to engagement. Once engaged, it holds position. Consequently, sucker rods thus prepared, each with a pre-stressed coupler 34 attached and a torque washer 32 inserted, can be inventoried where assembled or at some convenient storage facility.

When needed at a production site, as typified by the installation of FIG. 2, a supply of rods can be sequentially assembled into a continuous descending string quickly but with precise engagement of each. The positioning equipment which aligns a sucker rod in vertical orientation above the last previously installed rod enables entry of the lower pin end 23 with exposed threads into the open end of the facing coupler 34. The threaded surfaces have previously been coated with the "SEALLUBE" (or other) lubricant. After rotating the upper sucker rod 13 to engagement at the hand tight plane, the wrench flat 17 is engaged by a conventional power tool (e.g. hydraulic tongs) and the second sucker rod is turned through the same distance as the first rod plus 0.650 inches circumferential displacement. The wrench flat 17 on the already installed rod will be held by backup tongs against rotation while this final turn increment is added. When completed, this connection pre-stresses the second pin end 23 and coextensive length of adjacent coupler 34 proximate the undercut pin neck 24 as described above, but changes the pre-stress relationships in the central region significantly in different ways, and also introduces important structural factors. The torque applied in engaging the flat end faces varies with sucker rod size—typical minimum values being about 450 ft. lbs. for 5/8" rod, 1100 ft. lbs. for 1 1/8" rod, and 1400 ft. lbs for 1 1/2" rod. A 1" slim-hole rod is engaged to about 450 ft. lbs. or more.

The precisely defined axial lengths between a shoulder bearing face 22 and the pin end face, and between opposite faces of the torque washer 32 in relation to the end-to-end length of the coupler 34, establish that the torque washer 32 and adjacent threads on the pin ends are in controlled compression when the pins have been tightened as prescribed. In complementary fashion, the central region of the coupler 34 is now in tension, over an axial length spanning the torque washer 32 and the adjacent threads on the pin ends 23. The counteracting tension/compression forces at the opposite axial lengths of a pin end enhance securement of the engaged bearing faces to each other. The compression prestress at both the pin ends and pin shoulders are more than 10,000 psi but no more than 50,000 psi. This prestressing at spaced apart regions of the pin end and the coupler unifies the connection and militates against the minor detrimental relative movements and displacements which initiate and promote fatigue failure. Structurally, the pin ends 23 may be viewed as beams firmly constrained at both ends, so that radial forces acting to introduce bending or axial curvature are resisted by both male and female elements together, inhibiting relative spreading or shifting. Structurally also, torque forces and azimuthal displacement are resisted by strong frictional engagement between the engaging areas at the pin shoulder/coupler end regions and the pin end force/torque washer face regions.

These restraint forces are optimized by the uniformity of the flattened engaging surfaces. In addition, improved performance through repeated make and break operations is obtained by using a torque washer 32 of different material than the engaging pin ends 23, so as to limit galling. In addition, the chamfered edge 28 opposing faces of the pin ends 23 and the torque washer 32 help to assure that there is no overlap of one contact area relative to the other, and no sharp thread groove to mark or scratch the metal.

As evidenced by the Sandia and other reports mentioned previously, properly made up sucker rod joints that are used in sucker rod strings which have correct performance factors for the given field conditions are most likely to fail in a fatigue mode. The causes, as noted, predominantly arise from growth of minor defects or imperfections, or from expansion of initially minute displacements between parts during cycling. When connections of the API design are made up to the proper circumferential displacement, they have a free space at the coupler center, leaving the pin ends unsupported and the center region of the coupler with zero pre-stress. This allows the tension/compression load cycles to effect micro-movements at the contacting thread load flank and coupler end area to pin end shoulder surfaces. Over time these micro-movements cause permanent deformation of the thread load flank and shoulder contact surfaces and with increased relative movement between the mating parts the thread roots become stress concentration points that only shorten the useful fatigue life of the connection.

Truly remarkable improvements in fatigue life are achieved by sucker rods in accordance with the invention in comparison to the performance of comparable API and manufacturers high strength sucker rod. For test purposes, 1" sucker rod sections, including intermediate joints, of high strength specialty material (Norris) were carefully prepared in accordance with API and current invention designs to meet performance specifications. These specimens were mounted in fixtures and cycled between 5 and 20 Hz under loads varying between 69,500 lbs in tension to 7,800 lbs in compression until failure. The tension values equate to 40% of the ultimate tension value of the material. For four specimens each, the average load cycles to failure were 804,000 cycles for the sucker rods of the present invention, in contrast to 137,500 cycles for the API specimens. Failures in each instance were in the joint region, so that rod body failures do not affect the comparison. These fatigue tests were performed at Southwest Research Laboratories, San Antonio, Tex.

Consequently it can be concluded that the present invention provides fatigue life performance that is as much as six times better than the API counterpart. Tensile strength, furthermore, is not sacrificed by this new approach as shown by actual test results of increasing tensile loads to failure and tensile loads to failure under torsion. These load tests involving tensile values were run by Cfer Laboratories, Edmonton, Alberta, Canada.

To test tensile strength 4 specimens each of 7/8" sucker rods of proprietary high strength material (Norris) were prepared in accordance with the present invention and also API specifications. The average load to failure for specimens in accordance with the invention was 121,500 lbs; the average load to failure for the API sucker rods was 118,400 lbs. These results demonstrate that the design provides the drastic improvement in tensile properties mentioned above without sacrifice in tensile load performance.

Torsion tests under tensile load provide another valuable performance measurement. For this purpose four specimens each of 1" sucker rod connections were prepared from the proprietary high strength (Norris) material, for rods of both the present invention and API designs. The rods were put under 20,000 lbs tension and torques to failure. In contrast to sucker rods of the present invention, which failed at average 1350 ft. lbs of torque, sucker rods of API design failed at an average of 575 ft lbs of torque, or a better than 2:1 improvement ratio.

Further advantages of the present invention accrue from the locking of the wedge surfaces of the male and female threads which, in the API standards, employ a predetermined thread height to root depth relation that includes a gap sufficient to allow sliding and/or rocking of the wedge faces if not stressed axially. This accelerates fatigue failure, along with the high helix angle and thread flank angle. In addition to the prestress conditions which lock the thread, wedges, relative shifting between parts is inhibited by the ring-like contact area between the pin shoulder and the coupler end, and the disk-like contact area between the end face 30 of a pin 12 or 13 and the torque washer 32. These factors also augment the resistance against thread backout, enhanced by anaerobic adhesive.

The use of an intermediate torque washer is preferred over direct contact between pin end faces for a number of reasons, including the anti-galling properties of dissimilar metals. It also permits pre-stress levels to be varied simply by slight changes in the axial length of the torque washer, where a tradeoff in properties may be desired. Further, the standard length of coupler (within dimensional tolerances as specified) can be used in the combination. Nonetheless, in some instances, it may be beneficial to have direct end face contact between the pin ends, instead of an intervening torque washer or button, this being shown in FIG. 6. The major additional difference is that, given pin ends with API specs, the coupler 34' has to be shorter, essentially by the axial lengths specified in Table A for that size of sucker rod. Apart from the fact that the coupler 34' is under tension in the midregion over a shorter length than in the example of FIGS. 1, 3 and 4, the other pre-stress and structural relationships are preserved.

The advantages of this example can be realized also with API variants, such as heavy duty connections and "slim hole" (or "slim line") connections, examples of which is included hereafter with respect to an alternative design.

It is noted that API threaded parts can be machined or rolled to specification, the latter often being preferred as giving better properties, although shot peened machined threads can be quite comparable in properties.

In the arrangement depicted as a second example, the first and second sucker rods 47, 48 are 7/8" inch rods modified from an API standard design to include two threaded lengths at each pin end. Thus a first male thread region 50 is of 1.437 inch nominal diameter, with thread diameter form and pitch corresponding to that prescribed for an API sucker rod. Here the prescribed standard shoulder is used as a precursor structure, being modified by machining or rolling, into a second male threaded length 54 having a nominal diameter of 1.188". For the 7/8" sucker rod, the length from the distal end of the sucker rod 47 to the proximal end of the first male thread region 50 is 2.056 inches, the length of the first male thread region 50 is 0.663 inches, the length dimension of the intervening undercut 52 is 0.415 inches, and the length of the second male thread region 54 is 0.978 inches. All dimensions given are the nominal dimensions but plus and minus tolerance variations will be understood to apply. A center torque washer 56 is disposed in abutment with the distal end of each of the distal end faces of the first and second rods 47, 48 respectively. In this example, the center torque washer 56 has an axial length of 0.814" which can also be viewed as thickness between the pin end faces and an outer diameter of 1.050 inches, tolerances again being omitted.

The first and second rods 47, 48 are joined by a conforming sleeve or coupler 60, sometimes referred to as a box, with a non-API length of 4.312 inches in this ⅞" sucker rod example. End female thread regions 62, 63 have internal threads of a relatively larger diameter, mating with the first male thread regions 50 on the first and second rods 47, 48 respectively. The inner female thread regions 64, 65, separated from the end female thread regions 62, 63 by tapered transition gaps 66, 67 respectively, provide two thread bearing engagement regions for each of the sucker rods to be connected. The gap between the end faces of the rods 47, 48 provides a seating region for the central torque washer 56, which may be slid in through the smaller diameter inner female threads 62, or 63. A position determining gauge element (not shown) may be hand threaded in from one end to a hand-tight position to provide an axial positional reference as a first pin end is threaded into a selected position from the opposite end of the coupler 60. Alternatively the central torque washer 56 is fit into place and the second pin end is then merely inserted into abutment with the torque washer 56 after which it is tightened to a given torque load when the second pin end is inserted.

With the two pin ends in abutting relation (directly or through the washer), the torque exerted by a power tong (as indicated by the hydraulic pressure) is the only measured value that is needed to establish the desired compressive force between the pin ends. On ⅞" rods, about 1200 ft. pounds of torque are used. The torque washer 56 is made of a dissimilar material from the rod pin ends, the end faces of which are themselves finished so as to provide flattened and uniform bearing surfaces. The average surface area, for a 7/8" rod pin end, is 0.889 in$^2$, more than double the shoulder to coupler surface area of contact. Further, the joint is made up using only torque and the anaerobic adhesive sealing compound, e.g. "SEALLUBE", developed for use on oil and gas well downhole threaded connections.

The second thread area, formed at the nominal shoulder position, adds 1.622 in$^2$ of threaded area to the 0.8491 in$^2$ of the standard API threaded area, almost tripling the amount of bearing area available, because of the larger diameter of the second thread. The coupler as well has greater threaded area and contact, the factor here being about 1.6 times greater than an API coupler of the same size.

It is noted above that the preferred prior API method of make up is the displacement method, which introduces a torque of approximately 420–470 ft. pounds when properly done. Setting the proper displacement for two pin ends connected to the same coupler, however, is time consuming and as noted is not always observed in practice. In the present system, only the torque indication (via hydraulic pressure) is needed to establish the actual required tension and compression values, and this greatly facilitates the make up sequence.

Referring now to FIG. 9, the areas (A) under compression at the pin ends are to be compared to the areas (B) under tension along the coupler central region. This differential in stress establishes the static interaction between the thread regions that is desired to secure the pin ends against back threading relative to the coupler. It may be suggested that a slight mismatch between the first and second thread areas on a pin would further contribute to inducing tension in along the coupler and compression along the pin end, but the added bearing engagement would also substantially complicate the use of torque as a measure of engagement, although feasible.

Given controlled torque make up with anaerobic adhesive sealing compound, however, back turning of the pin ends relative to the coupler during cycling is essentially eliminated by the opposing prestress factors. The pin nose contact pressure that is achieved introduces resistance to back-out forces that is far beyond the ultimate load required for failure in all sizes. Tests have shown that when the coupler and pin are made up, only to hand tight level, with the anaerobic adhesive sealing compound, and the compound has been fully cured, 350 ft. pounds of torque are required just to shear the sealant material, without even considering overcoming the high torque introduced. The anaerobic adhesive is impervious to all gases and fluids encountered in production, and completely seals and protects the threads. The surfaces that are in engagement are of materials and design such that galling during makes and breaks is eliminated.

With this arrangement, preexisting inventories of API sucker rod can be utilized, simply by modifying the standard reference shoulder of the API sucker rod to form a first male thread region that is of larger diameter than the existing end thread region. The load distribution on the thread bearing engagement region is then extended, in terms of pure longitudinal tensile stresses, between the end and inner threads on the sucker rods, and the complementary threads on the collar. In consequence, pull tests reveal an excess of 50% increase in resistance to tensile loads, which ensures that if tensile stress reaches a point at which failure must occur, it will be in the sucker rod length, rather than in the thread region. Thus, selection of the proper API sucker rod specification for placement in a string is all that is needed to eliminate a weak point in the string.

In FIG. 10, which illustrates an extra heavy duty or "large step" design, the sucker rod is selected to be of 1¼" diameter and the first threaded region 50' has a greater nominal diameter (in the ratio of 1.750 to 1.3750) than the second threaded region 54' adjacent the pin end. The wall thickness of the coupler 60' in the central region, therefore, is substantially greater than adjacent its ends.

FIG. 11 depicts an improved form of a "slim-hole" type of API standard sucker rod joint. In this joint 80, the wrench flats 82, on the diagonal, have a greater exterior dimension than the nominal shoulder normally incorporated in the pin end. Here, the modified shoulder 84 is of smaller dimension than the maximum wrench flat 82 dimension, and the coupler 86 therefore has an exterior dimension that is no greater than the maximum dimension of the wrench flat 82.

Figure 12:
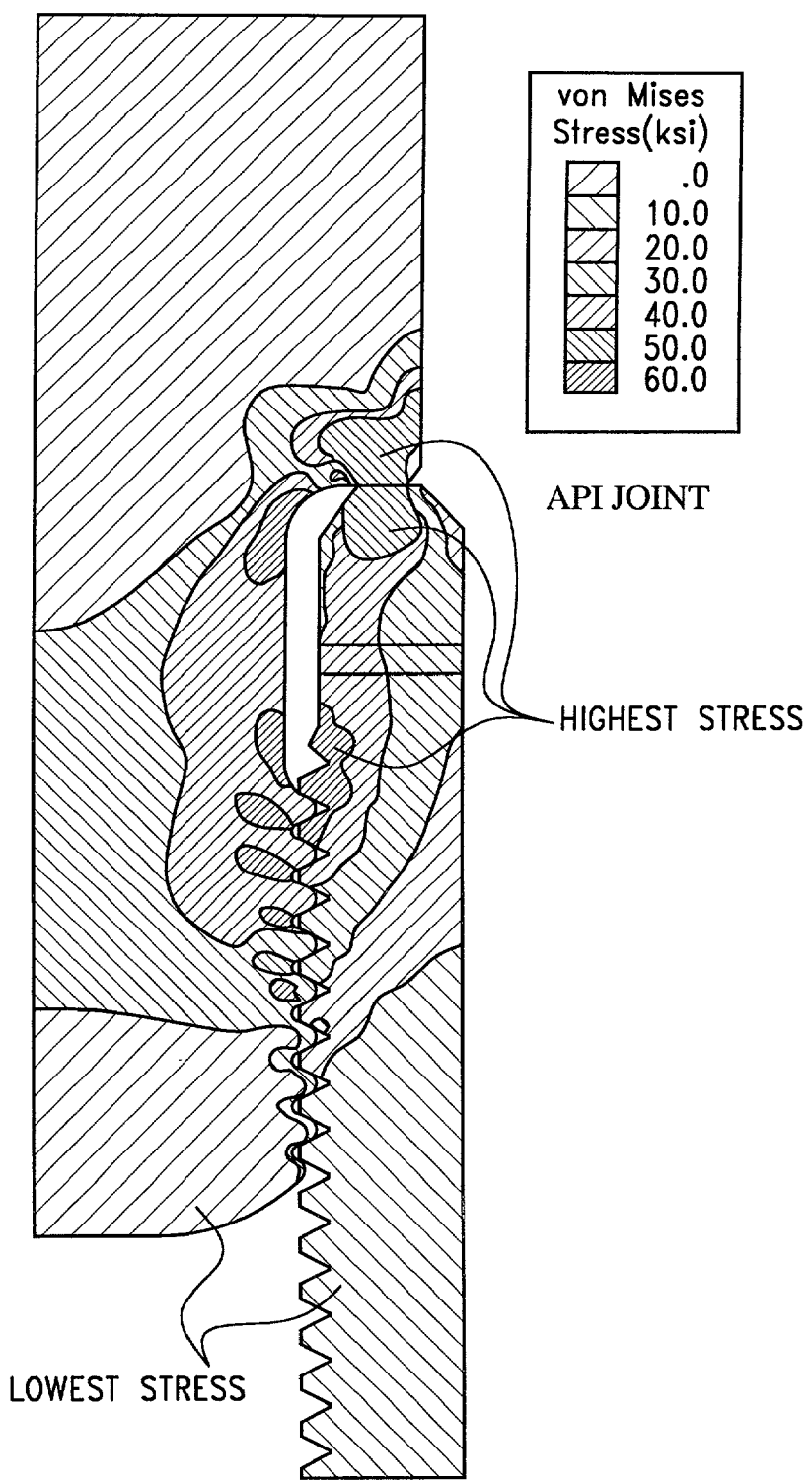
FIG. 12 is a VonMises diagram of stress distributions in a conventional API sucker rod joint.
Figure 13:
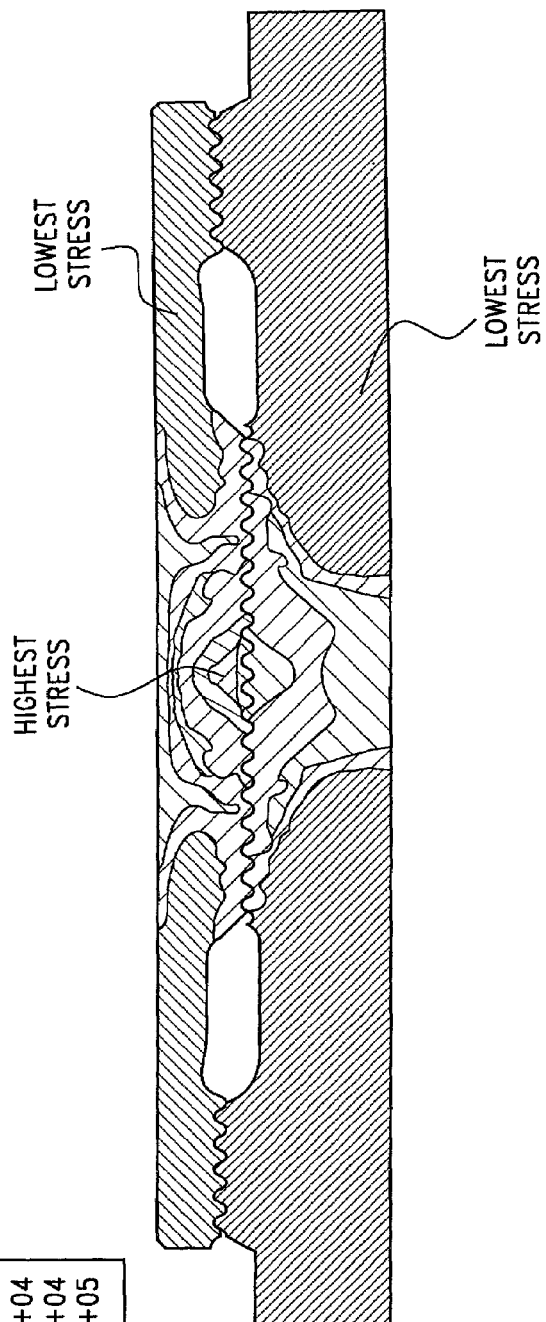
FIG. 13 is a VonMises diagram of stress distributions in a sucker rod joint in accordance with the invention.

The contrast between the stresses induced in a standard API joint and joint in accordance with the present invention are depicted in monochromatic form in FIGS. 12 and 13. In the API joint 90, shown partially in FIG. 12, the maximum Von Mises stress, in KSI, is reached in the undercut region of the pin, as well as the coupler end-pin shoulder contact region, as well as in the first threads of the pin that are adjacent the undercut region. Incipient fatigue fractures occurring in these areas and accentuated by displacement of the coupler end from the pin shoulder provide ready pathways for expansion of fatigue cracks, leading to ultimate failure. It should be noted again that the simulation is based upon the assumption that the pin shoulder is backed by a uniform diameter rod, which offsets the readings materially. A more exact simulation would favor the present invention even more. Because the color densities appear ambiguous in the monochromatic view, higher and lower stress areas have been designated by legends.

In the example of FIG. 13, showing Von Mises stress for an improved joint 95 in accordance with the invention, it can be seen that the abutting thread regions, being under compression on the pins, are at low value in terms of tensile stress, whereas the coupler is tensioned most in its central region, where it is thickest and where there is the greatest amount of bearing surface area. In the secondary or outer thread bearing areas, this stress is substantially lower.

The example of FIG. 13 is one in which no center torque washer is employed, but each pin end 96, 97 is threaded into the center region to a depth at which the end faces of the pins are in abutment and under compression while the coextensive span of the coupler 99 is under tension.

Given these factors, therefore, it can be understood why failure tests show that the improved joint yields only when the tensile loading reaches 175,000 lbs, whereas API standard joint fails at 118,000 lbs. Moreover, the failure of the improved coupling is at the connection first, unless there is a defect in the rod. With standard API couplings, the failure is in the pin or coupler, and generally results from material fatigue.

Figure 14:
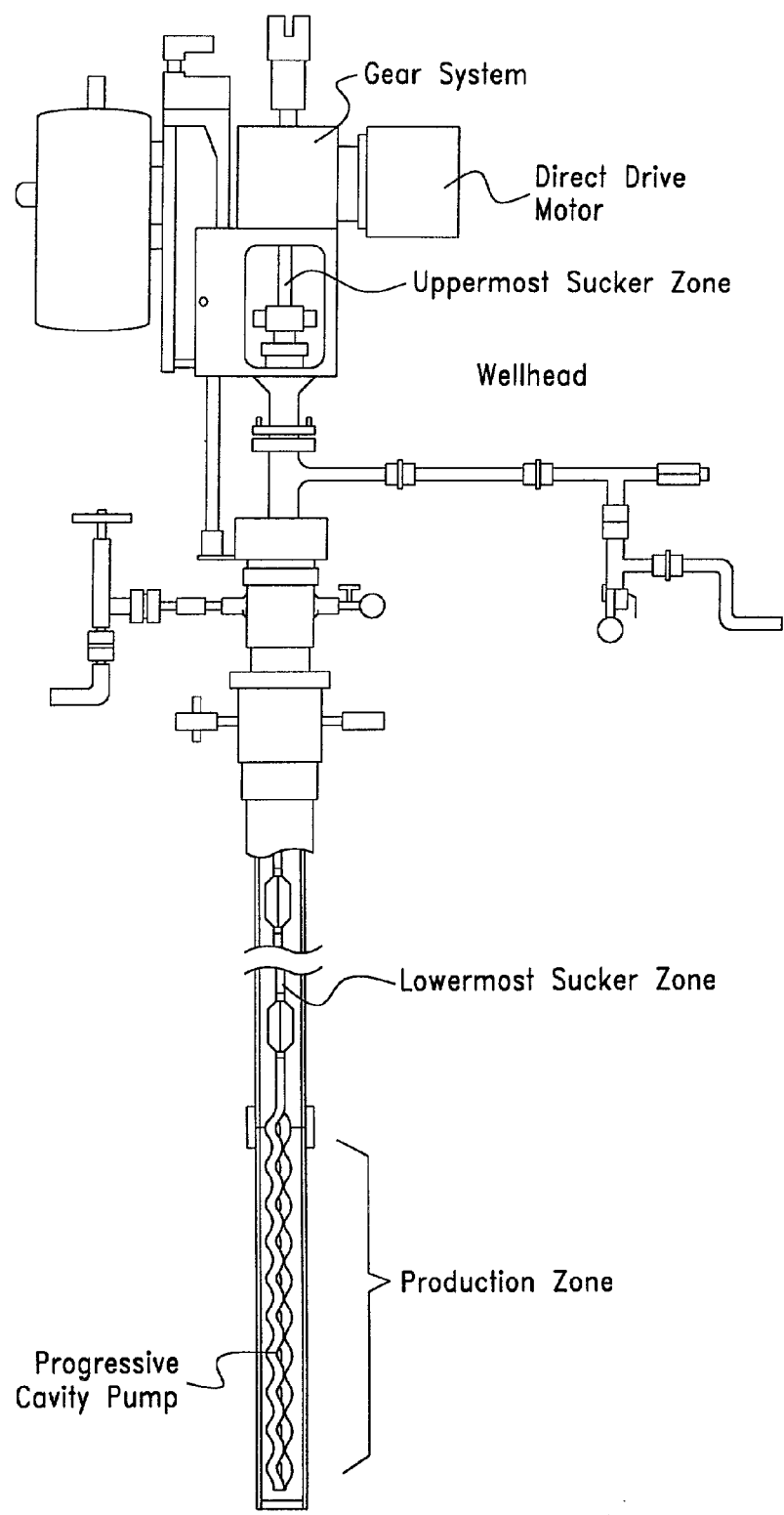
FIG. 14 is a simplified view of a sucker rod installation in which sucker rods in accordance with the invention drive a progressive cavity pump.

For a sucker rod system which is to drive a rotary pump, as shown in FIG. 14, the threaded connections are all configured to tighten rather than unthread, in the direction of pump rotation. At the well head L no tower, scaffold or derrick is required, since the drive comprises basically a direct drive motor M coupled through a gear system N to the uppermost sucker rod $R_1$. At the production zone Q the lowermost sucker rod $R_n$ drives a progressive cavity pump which rotates about the sucker rod axis in that region. Otherwise, essentially the same sucker rod connection is utilized to assemble the sucker rod string. It will also be appreciated that other variations of the invention can be used, and that the sucker rods need not be to API design, although the material advantages derived from being able to use the existing inventory are substantial.

Methods in accordance with the invention, for the alternative configuration, utilize a number of steps prior to assembly into a sucker rod string. API sucker rods are initially inspected for defects, including minor defects such as scratches, corrosion and nicks, and graded in accordance with material and size for usage at appropriate positions in the designed sucker rods string for a particular application. In the preferred example the length variations are held within 0.0005", in accordance with the above description, and threads are formed by machining or rolling. A coupler of mating dimensions is fabricated, but the tolerances are not only maintained within API tolerances, but typically are substantially less, of the order of ½ or more. This helps to assure that, whatever the tolerance variations in the sucker rod pin ends, the thread, diameter and pitch variations will assure that engagement by torque alone will provide the desired bearing engagement and tension or compression properties. In the field, with anaerobic adhesive properly applied, one pin end is threaded into one end of the coupler, and made hand tight against a reference gauge inserted from the opposite end. The reference gauge is preferably of a type which is precisely positioned by single turn threading to a hand tight position. If a central torque washer is to be used, it is inserted into the central circumferential groove in the coupler wall before insertion of the second pin end. The pin end, also lubricated with the anaerobic sealant, is then threaded into contact with the opposite pin end or the torque washer. The joint is completed by being tightened by a power tong or other tool to the chosen torque level. The procedure is repeated for successive joints in the string.

While various forms and modifications have been shown and described, it will be appreciated that the invention is not limited thereto but encompasses all variations and expedients within the scope of the following claims.

I claim:

1. A connection for sucker rods used in strings in petroleum wells to pump petroleum along production tubing from a down hole pump, comprising:
    a pair of sucker rods, each having a pin end with a flat transverse end face and at least an adjacent male threaded section;
    a coupler of known length between opposite end faces and having at least two interior female threaded sections receiving the male threaded sections of the pin ends, wherein the pin ends of the sucker rods include coupler end engagement members spaced apart from the end faces of the sucker rods and engageable against the coupler end faces; and
    the pin ends of the sucker rods are dimensioned in length relative to the coupler length to provide prestressing compressional loading forces between opposing end faces of the pin ends when the male threaded sections are matingly threaded to preselected penetrations in the coupler past engagement of the coupler end engagement members with the coupler ends.

2. A connection as set forth in claim 1 above, wherein the preselected insertion for each pin end is to a chosen displacement beyond insertion of the coupler end engagement members to a hand tight position, whereby lengths of the pin end sections from the end faces are prestressed in compression and coextensive of the coupler are prestressed in tension and the mating threads lock under prestress to inhibit relative movement.

3. A connection for sucker rods as set forth in claim 1 above, wherein the end faces are flat and are engaged with a torque of at least 450 ft. lbs. for ⅝ inch rod, 1100 ft. lbs. for 1⅛ inch rod, and 1400 ft. lbs. for 1½ inch rod when the pin ends are engaged in the coupler.

4. A connection as set forth in claim 3 above, wherein the torque engagement for a 1 inch slim-hole sucker rod is about at least 950 ft lbs.

5. A connection for sucker rods as set forth in claim 1 above, further including a torque washer of a selected axial dimension with flat transverse sides and disposed centrally in the coupler between the pin end faces and engaged on each side by the flat end faces of the pin ends, and wherein the length dimensions of the pin ends relative to the coupler length are selected to account for the presence of the torque washer therebetween to provide prestressing compressional loading forces on the pin ends.

6. A connection as set forth in claim 5 above, wherein the torque washer is of different material than the pin ends to prevent galling and has flat end faces, the pin end faces and washer end faces each include peripheral chamfers, and the male threads are rolled or machine cut.

7. A connection for sucker rods as set forth in claim 6 above, wherein the pin end faces are flat end finished to ±0.0005 inch flatness and to a selected axial dimension with less than ±0.0005 inch tolerance from the selected dimension.

8. A connection for sucker rods as set forth in claim 7 above, wherein the connection further includes anaerobic adhesive between the matingly engaged threaded regions.

9. A connection for sucker rods as set forth in claim 1 above, wherein the coupler has spaced apart end walls, the pin ends each include a radially extending shoulder spaced by a distance from the end face predetermined to engage the adjacent end wall of the coupler with compressive prestress load when the pin end faces are under compression to the selected level.

10. A connection for sucker rods as set forth in claim 9 above, wherein the compression prestress at both the pin ends and the pin shoulders is in excess of 10,000 psi but no more than 50,000 psi stress.

11. A connection for sucker rods as set forth in claim 10 above, wherein the prestress is in the range of 18,000 to 22,000 psi for 1 inch slim-hole sucker rods at both the end faces and the shoulder region.

12. A connection for sucker rods as set forth in claim 11 above, wherein a sucker rod of ⅝ inch to 1¼ inch has an end shoulder to pin end face dimension within ±0.0005 inch of a selected dimension, the thread section is rolled thread, the coupler has an end to end length of 4.000 inch±0.0005 inch and the connection includes a torque washer of selected axial length between the pin end faces.

13. A connection for sucker rods as set forth in claim 1 above, wherein the pin ends each include a second male threaded section spaced axially from the first male threaded section and having a greater radius than the first section, and wherein the coupler includes second female threaded sections spaced and sized to matingly engage the section male sections when both pin ends are inserted.

14. A connection for sucker rods as set forth in claim 13 above, wherein the second threaded sections have greater a real contact than the first sections, wherein the connection includes a torque washer between the pin end faces, and wherein for a ⅞ inch rod pin end, the threaded surface areas are about 1.622 in$^2$ for the second threaded sections and about 0.8491 in$^2$ for the first threaded section and the pin end face surface areas are about 0.889 in$^2$ and wherein the pin ends are engaged to a torque level of about 950 ft. pounds.

15. A fatigue-resistant combination for interconnection of sucker rods into a sucker rod string for use in pumping petroleum to the surface from a downhole location, by joining each pair of opposing pin ends with a separate coupler, comprising:
 a cylindrical coupler having an interior axial bore and a central region with female threaded sections at least on each axial side of the central region;
 a torque element of a selected axial length disposed in the central region of the coupler and having transverse end faces;
 a pair of pin ends of sucker rods engaged in the axial bore of the coupler from opposite ends thereof; the pin ends having flat end faces and adjacent male thread sections that are each matingly engaged into a female threaded section of the coupler, and including shoulders adjacent the male thread and spaced from the end faces of the pin ends engaging the opposite end faces of the torque element to prestress at least portions of the male thread sections of the pin ends in compression and associated portions of the coupler in tension when the pin ends are engaged in the coupler to a selected displacement of the shoulders against the coupler ends past a hand tight position at which the shoulders first engage the coupler ends.

16. A combination as set forth in claim 15 above, wherein the male and female threads meet predetermined standards for disparity in thread heights, and wherein the prestress conditions lock the differently threaded elements together to inhibit relative displacement and fatigue failure under repeated cycling and bending stresses.

17. A combination as set forth in claim 16 above, wherein the coupler and pin ends are compatible with interconnectability and performance standards but have axial dimensions that are precise within ±0.0005 inches of selected standards, wherein the pin ends have a pin neck between the shoulder surface facing the pin end, wherein the torque element is of a different material than the pin ends to prevent galling, wherein anaerobic adhesive is disposed between the matingly engaging male and female threads, and wherein the pin end face and torque element end faces have peripheral chamfers.

18. A connection for sucker rods used in pumping in oil well installations, comprising:
 a sleeve coupling with an interior female threaded surface and dimensioned in accordance with interconectability and performance specifications and having end walls of given radial dimension;
 a pair of sucker rod pin ends, each threaded into the coupling from a different end, each of the pin ends having a male threaded end portion with an end face transverse to the longitudinal axis of the rod that deviates less than about 0.0005 inches from an end face plane, a transverse shoulder spaced from the end plane by a pre-stress dimension, and an undercut pin neck between the root thread of the male thread and the transverse shoulder, and
 a torque disk having parallel planar faces spaced apart by a predetermined axial distance the faces deviating from a plane by less than aboat 0.0005 inches and the torque disk being of different material than the pin ends,
 where the spacings between the pin ends and the shoulders, and the axial distance between torque disk faces area selected such that with thread makeup to an operative tightness the end regions of the coupling are in compression coextensive with the pin neck regions and the coupling is in tension coextensive with the torque disk, and pressure and frictional contact are maintained between the pin ends and torque disk and the end walls of the coupling and the pin shoulders.

19. A connection as set forth in claim 18 above, wherein the connection also includes anaerobic adhesive sealing and joining at least the threaded regions, and wherein the coupler length, for a ⅝ inch to 1⅛ inch coupling, is 4.000 inches ±0.0005 inch and the pin end dimension for a ⅝ inch to 1⅛ inch coupling is accurate to 0.0005 inch, and the torque washer length is accurate to ±0.0005 inch and includes an edge chamfer at each end, and wherein the thread pitch diameter varies with sucker rod size and, for a ⅞ inch rod is 1.121 inches +0/−0.20 inches.

20. A threaded connection for a down hole rod system for driving a down hole rotary or reciprocal pump, comprising:
 first and second rods, each having an end threaded male section having a first diameter and an adjacent threaded male section spaced apart therefrom and having a second diameter greater than the first diameter;
 and a coupler sleeve engaging the first and second rods in end to end relation, and including first and second female thread sections in each end sized to mate with the male threads on the first and second rods.

21. A connection as set forth in claim 20 above, wherein the coupler sleeve includes interior transition sections between the first and second female thread sections and a center interior gap between the smaller diameter female thread sections, and the connection includes a torque washer between and engaging the ends of the first and second rods.

22. A connection as set forth in claim 21 above, wherein the axial length of the larger diameter male sections is shorter than the axial length of the end threaded sections on the rods, and wherein the rods and torque washer have planar end faces in engagement, and wherein the axial positions of the threaded male sections are dimensioned relative to the end faces to place the torque washer under compression when the thread engagement is tightened to a selected displacement from a hand tight plane.

23. A connection for sucker rods used in pumping installations in oil wells, comprising:

a sleeve coupling with interior counter bores at each end region and with an interior and female threaded surface between said counter bores and dimensioned in accordance with specifications which establish that a string of sucker rods can be interconnected to provide predictable performance, and having end walls of given radial dimension and axial dimension within tolerances of ±0.0005 in. in relation to nominal dimensions within the selected specifications;

a pair of sucker rod pin ends meeting the interconnectability standards, each threaded into the coupling from a different end, each of the pin ends having a male threaded end portion with an end face transverse to the longitudinal axis of the rod that deviates less than about 0.0005 in. from a nominal end face plane, a transverse shoulder spaced from the end face plane by a pre-stress dimension, and an undercut pin neck between the root of the male thread and the transverse shoulder, and a torque disk having parallel planar faces spaced apart by a predetermined axial distance between torque disk faces selected such that the thread makeup is to an operative penetration in the coupling, the end regions and the coupling are in compression coextensive with the pin neck regions and the center region of said coupling in tension is in tension coextensive with the torque disk, and compressive force and frictional contact are maintained between the pin ends and the end walls of the coupling and the shoulders.

24. A sucker rod coupling unit comprising:

a sleeve coupling and two sucker rod pin ends with predetermined dimensional criteria and the pin ends including pin neck areas and adjacent shoulders, and the coupling unit further including a torque disk between the pin ends, and being made up with torque or circumferential displacement methods to establish compressive contact forces between the pin end shoulders and coupling end areas and pin thread end areas and the torque disk, and tension force in the pin neck area and in the mid region of the sleeve coupling;

said induced forces imparting a pre-stress into the made up coupled unit at a degree calculated as to be higher for each sucker rod size and material than any stresses induced by future operating loads.

25. A coupling unit as in claim 24 with dimensions such that when the coupling is made up with either a torque or circumferential displacement method it establishes a pre-stress in the unit that eliminates detrimental relative movement between the three combined parts approaching or at the microstructure level of the materials used in the parts.

* * * * *